fitted beneath the seed-box, and having an aperture c cut into that of their sides which faces the channel b, substantially as described and shown.

2. The combination of the distributing-wheels described in the first claim with a shaft A along which they may be shifted lengthwise, whereby the possibility is given of removing the distributing-wheels apart from the feed-hoppers D, when it is desired to facilitate the emptying of the contents of the seed-box, and also the removal of the distributing-wheels, substantially as described and shown.

In testimony whereof I affix my signature in presence of two witnesses.

ROBERT COPE BLAKEY.

Witnesses:
A. SCHLESSING,
F. BELMONT.